(12) United States Patent
Yen et al.

(10) Patent No.: US 10,259,162 B2
(45) Date of Patent: Apr. 16, 2019

(54) LASER MODULE WITH DETACHABLE STRUCTURES OF THREE-DIMENSIONAL PRINTER

(71) Applicants: XYZPRINTING, INC., New Taipei (TW); KINPO ELECTRONICS, INC., New Taipei (TW)

(72) Inventors: Chao-Yu Yen, New Taipei (TW); Chen-Fu Huang, New Taipei (TW); An-Hsiu Lee, New Taipei (TW)

(73) Assignees: XYZPRINTING, INC., New Taipei (TW); KINPO ELECTRONICS, INC., New Taipei (TW)

( * ) Notice: Subject to any disclaimer, the term of this patent is extended or adjusted under 35 U.S.C. 154(b) by 336 days.

(21) Appl. No.: 15/410,770

(22) Filed: Jan. 20, 2017

(65) Prior Publication Data

US 2018/0133982 A1 May 17, 2018

(30) Foreign Application Priority Data

Nov. 17, 2016 (CN) ..................... 2016 2 1235014 U

(51) Int. Cl.
| | |
|---|---|
| *B29C 64/20* | (2017.01) |
| *B29C 64/264* | (2017.01) |
| *B33Y 30/00* | (2015.01) |
| *B29C 64/268* | (2017.01) |
| *B29C 64/25* | (2017.01) |

(Continued)

(52) U.S. Cl.
CPC ............ *B29C 64/264* (2017.08); *B29C 64/00* (2017.08); *B29C 64/153* (2017.08); *B29C 64/25* (2017.08); *B29C 64/268* (2017.08); *B29C 64/30* (2017.08); *B33Y 30/00* (2014.12)

(58) Field of Classification Search
CPC ..... B29C 64/25; B29C 64/264; B29C 64/268; B29C 64/273; B29C 64/277; B29C 64/282; B29C 64/30
See application file for complete search history.

(56) References Cited

U.S. PATENT DOCUMENTS

| | | | |
|---|---|---|---|
| 5,637,175 A * | 6/1997 | Feygin | .................. B29C 64/141 156/256 |
| 9,908,290 B1 * | 3/2018 | Clayton | ................ B29C 64/386 |

(Continued)

OTHER PUBLICATIONS

L-Cheapo Promo Video, https://www.youtube.com/watch?v=jiygcClkc6I, May 19, 2014 (Year: 2014).*

*Primary Examiner* — Timothy Kennedy
(74) *Attorney, Agent, or Firm* — Chung-Ming Shih; HDLS IPR Services

(57) ABSTRACT

A laser module with removable structures of three-dimensional printer includes a platform, a carrying seat and a laser module. The platform has a working side and a movement mechanism; the movement mechanism at least has a displacement rod. The carrying seat is disposed on the displacement rod, and the movement mechanism drives the carrying seat to move on the working side along the displacement rod. The carrying seat has an assembly portion, and the laser module is disposed on the assembly portion of the carrying seat and detachably integrated with the assembly portion as a whole. Thereby the purposes of fast and convenient disassembly can be achieved through assembling the laser module on the carrying seat.

10 Claims, 5 Drawing Sheets

(51) Int. Cl.
*B29C 64/30* (2017.01)
*B29C 64/00* (2017.01)
*B29C 64/153* (2017.01)

(56) References Cited

U.S. PATENT DOCUMENTS

| | | | |
|---|---|---|---|
| 2006/0156978 A1* | 7/2006 | Lipson | B29C 64/386 |
| | | | 118/708 |
| 2016/0039149 A1* | 2/2016 | Cassara | B29C 64/386 |
| | | | 425/150 |
| 2016/0067827 A1* | 3/2016 | Zediker | B23K 26/342 |
| | | | 219/76.12 |
| 2016/0243618 A1* | 8/2016 | Heugel | B29C 64/165 |

* cited by examiner

LASER MODULE WITH DETACHABLE STRUCTURES OF THREE-DIMENSIONAL PRINTER

BACKGROUND OF THE INVENTION

Field of the Invention

The present invention generally relates to a three-dimensional printer device and, more particular, to a laser module with detachable structures of a three-dimensional printer.

Description of Prior Art

A traditional three-dimensional printing machine mainly comprises a platform and a laser module acting on the platform. The laser module is capable of performing a reciprocating movement on the platform through a movement mechanism. The movement mechanism is provided for the laser module sliding thereon through two parallel displacement rods; thereby a three-dimensional object can be formed.

However, the laser module has needs of disassembly, so that not only parts of the case, but also the displacement rods of the movement mechanism has to be disassembled when the laser module needs to be removed; thus it is inconvenient in disassembly and assembly. Especially due to the restriction of the case, it has difficulty of disassembling the laser module and the displacement rods of the movement mechanism locating in the case. Therefore, the case must be removed together, and this causes complex steps of disassembly.

In view of the above drawbacks, the Inventor proposes the present invention based on his expert knowledge and elaborate researches in order to solve the problems of prior art.

SUMMARY OF THE INVENTION

Accordingly, an object of the present invention is to provide a laser module with removable structures of a three-dimensional printer, in which the laser module of the three-dimensional printer can be easily and quickly disassembled without disassembling other components.

Accordingly, another object of the present invention is to provide a laser module with removable structures of three-dimensional printer, in which the assembly of the laser module is from top to bottom; therefore, under the premise of the above-mentioned main objective, the convenience of quick disassembly can be achieved without disassembling the external case.

In order to achieve the object mentioned above, the present invention provides a laser module with removable structures of three-dimensional printer including a platform, a carrying seat and a laser module. The platform has a working side and is provided with a movement mechanism, and the movement mechanism at least has a displacement rod. The carrying seat is disposed on the displacement rod, and the movement mechanism brings the carrying seat moving on the working side along the displacement rod. The carrying seat has an assembly portion, and the laser module is disposed on the assembly portion of the carrying seat and detachably integrated with the assembly portion as a whole.

In order to achieve the object mentioned above, the present invention provides a laser module with removable structures of three-dimensional printer, in which the assembly portion has a plurality of lower engaging portions extended at an outer edge thereof, and a bottom of the laser module also extends outwardly with a plurality of upper engaging portions correspondingly; the upper engaging portions and the lower engaging portions are engaged with each other.

BRIEF DESCRIPTION OF DRAWING

The features of the invention believed to be novel are set forth with particularity in the appended claims. The invention itself, however, may be best understood by reference to the following detailed description of the invention, which describes a number of exemplary embodiments of the invention, taken in conjunction with the accompanying drawings, in which:

DETAILED DESCRIPTION OF THE PREFERRED EMBODIMENTS

In cooperation with attached drawings, the technical contents and detailed description of the invention are described thereinafter according to a number of preferable embodiments, being not used to limit its executing scope. Any equivalent variation and modification made according to appended claims is all covered by the claims claimed by the present invention.

Figure 1:
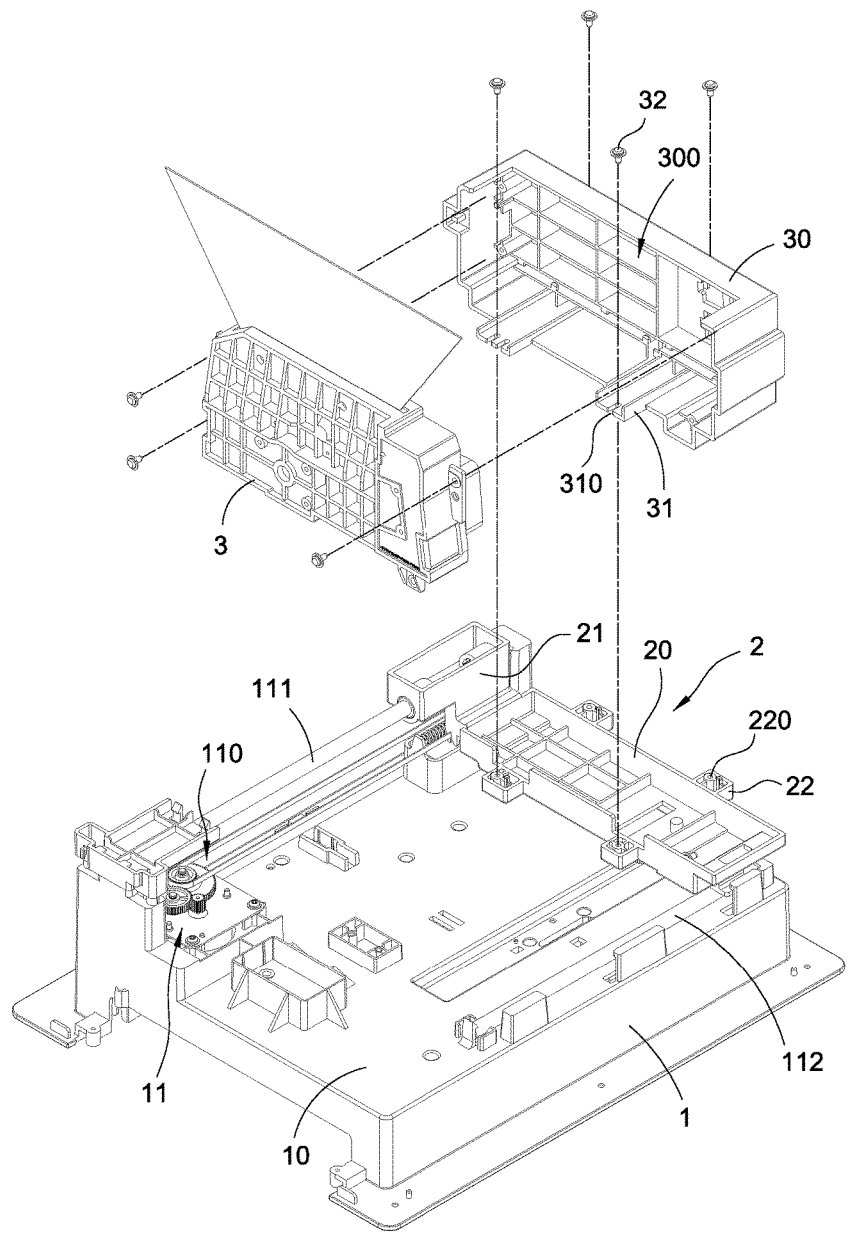
FIG. 1 is a perspective explosion schematic view of the present invention.
Figure 2:
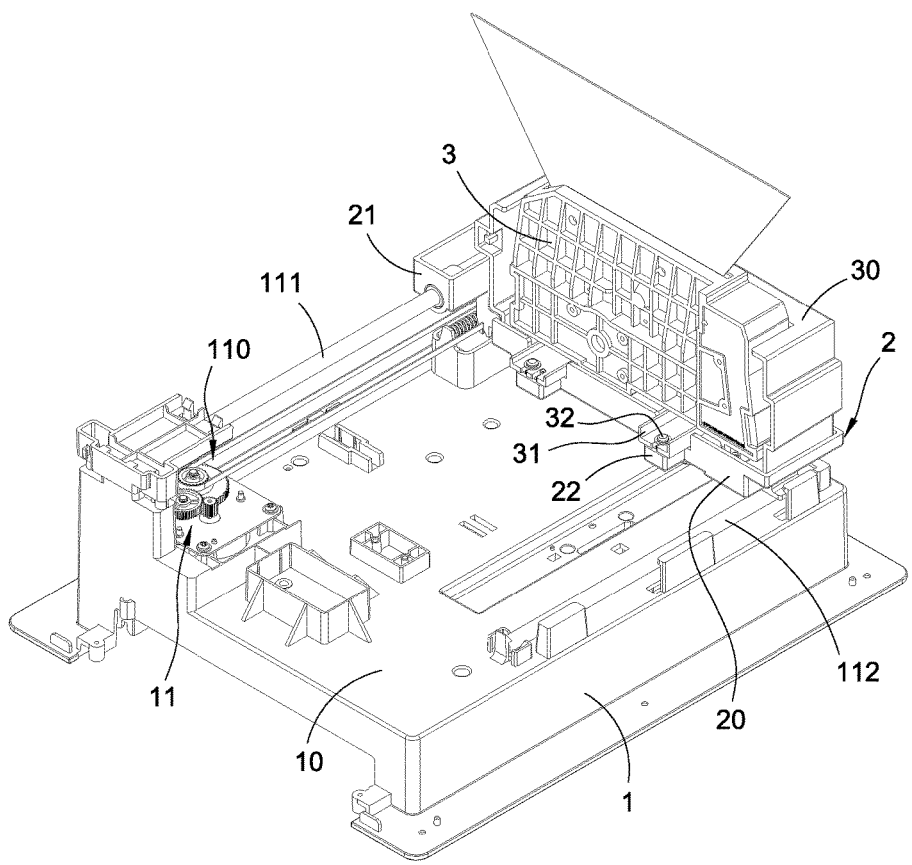
FIG. 2 is a perspective assembly schematic view of the present invention.
Figure 3:
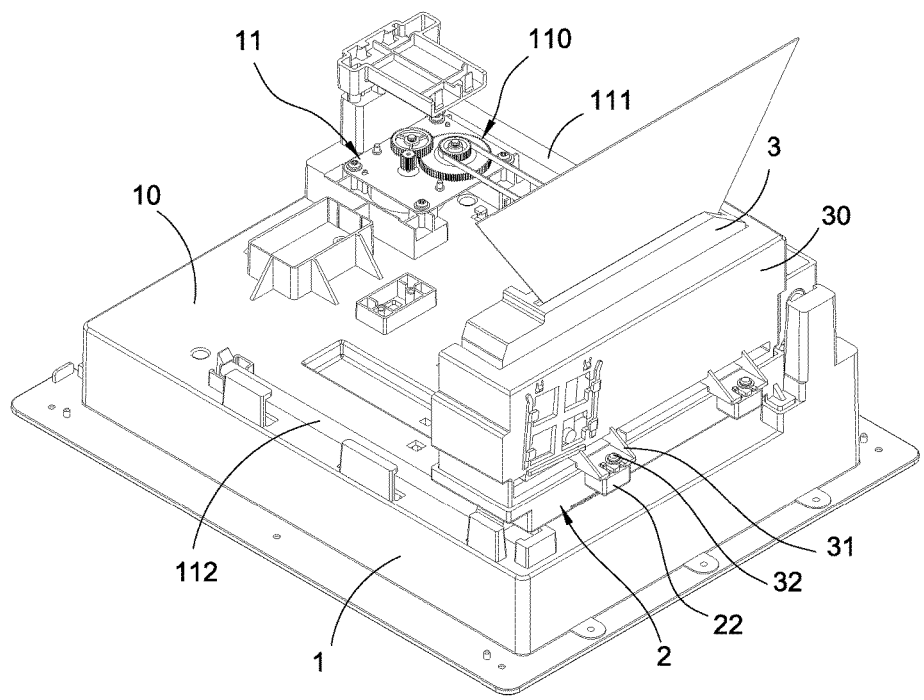
FIG. 3 is another perspective assembly schematic view of the present invention.

Please refer to FIG. 1, 2 and FIG. 3, they depict a perspective explosion schematic view, a perspective assembly schematic view and another perspective assembly schematic view of the present invention. The present invention provides a laser module with detachable structures of a three-dimensional printer for installing in a case (not shown) of a three-dimensional (3D) printing machine. The laser module with detachable structures includes a platform 1, a carrying seat 2 and a laser module 3.

The platform 1 is installed in the case (not shown) for holding main components inside of the 3D printing machine. For example, a control circuit board (not shown) is disposed thereon as to electrically connect each of the main components inside the 3D printing machine. Therefore, a normal operation can be achieved by a numerical controlling through the control circuit board. The platform 1 has a working side 10, and the platform 1 is provided with a movement mechanism. The movement mechanism 11 is used to bring the carrying seat 2 moving on the working side 10 so that the laser module 3 assembled on the carrying seat 2 can perform a three-dimensional forming process of an object. In more detail, in an embodiment of the present invention, the movement mechanism 11 further includes a driver 110 and at least one displacement rod 111. The carrying seat 2 is disposed on the displacement rod 111 for the driver 110 can drive the carrying seat 2 moving on the working side along the displacement rod 111. With further, in order to let the carrying seat 2 move more steadily, the movement mechanism 11 further includes a balance bar 112. The displacement rod 111 is disposed in a side of the carrying seat 2, and the balance bar 112 is disposed in another side of the carrying seat 2; thus the displacement rod 111 and the balance bar 112 are disposed at two sides of the carrying seat 2 as to make the carrying seat 2 have a better stability in movement.

Figure 4:
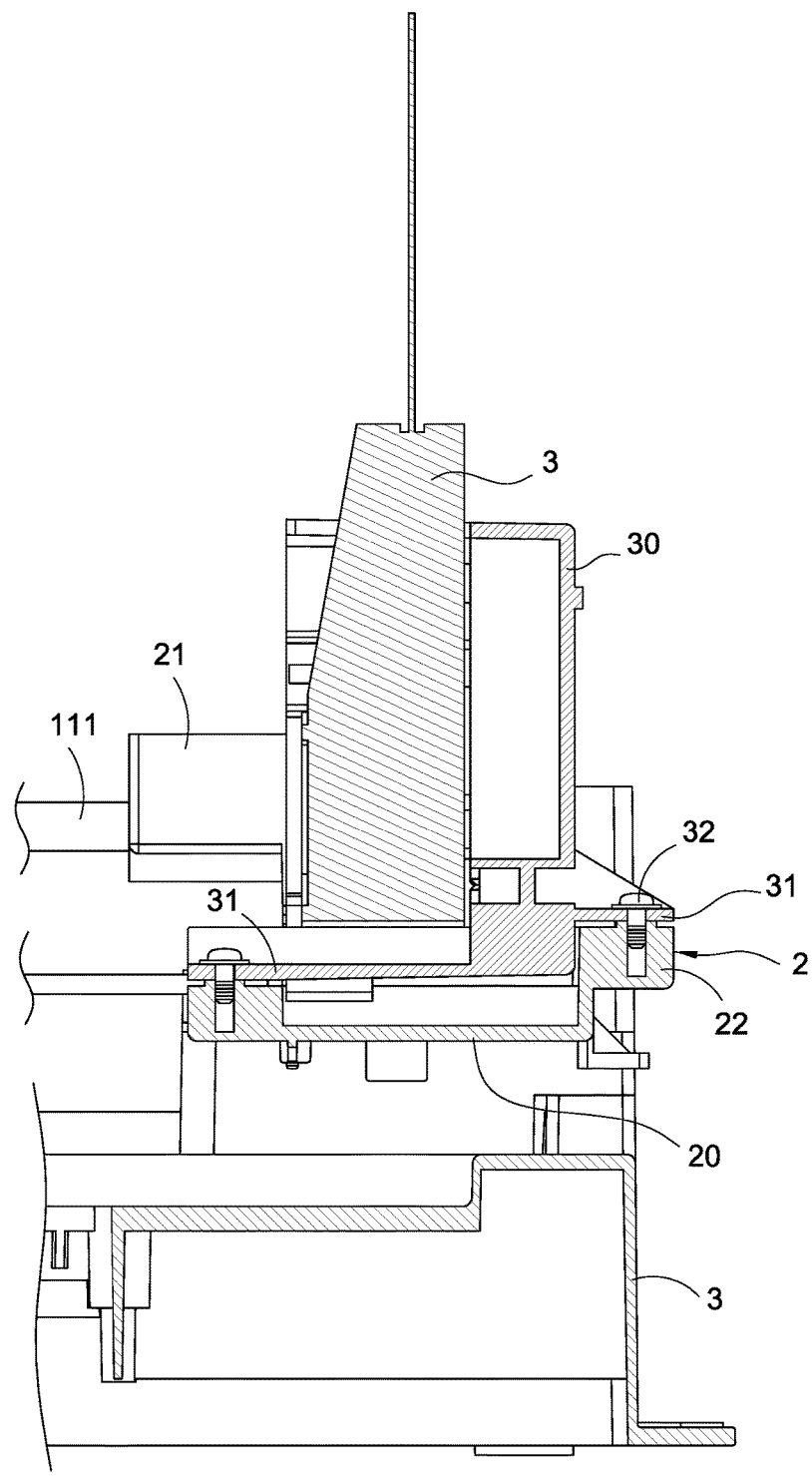
FIG. 4 is a partial cross sectional schematic view of the present invention.

As shown in FIG. 4, in the present invention, the carrying seat 2 is located between the movement mechanism 11 and the laser module 3, and the laser module 3 is coupled to the carrying seat 2 in a detachable manner. Therefore, the movement mechanism 11 and the displacement rod 111 have no needs to be removed so that the purposes of fast and convenient disassembly can be achieved when the laser module 3 is disassembled.

As described above, the carrying seat 2 has an assembly portion 20 and a sleeve portion 21 disposed in a side of the assembly portion 20. The assembly portion 20 can be a carrier board which is disposed across the displacement rod 111 and the balance bar 112 for the laser module 2 coupled thereon. And the sleeve portion 21 is provided for the displacement rod 21 slidably sleeved in as to combine with the movement mechanism 11 and to keep a stability of the assembly portion 20 while moving. In an embodiment of the present invention, the laser module 3 further includes a cover 30, and the cover 30 has a chamber 300 for accommodating the laser module 3 to be coupled with the cover 30. Then the cover 30 and the laser module 3 are assembled on the assembly portion 20 of the carrying seat 2 together. In more detail, the carrying seat 2 has a plurality of lower engaging portions 22 extended at an outer edge of the assembly portion 20, and a bottom of the cover 30 also has a plurality of upper engaging portions 31 extended outwardly and horizontally corresponding to the lower engaging portions 22. When the cover 30 and the laser module 3 are assembled on the assembly portion 20 together, the upper engaging portions 31 and the lower engaging portions 22 will be engaged correspondingly. For example, the upper and lower engaging portion 31, 22 can be combined with a binding element 32. The binding element 32 is a screw; in addition, the lower engaging portion 22 has a screw hole 220, and the upper engaging portion 31 has a through hole 310. Thereby, the binding element 32 is screwed in the screw hole 220 by passing through the through hole 310, and the upper engaging portions 31 and the lower engaging portions 22 can be combined into one piece in a detachable manner.

Figure 5:
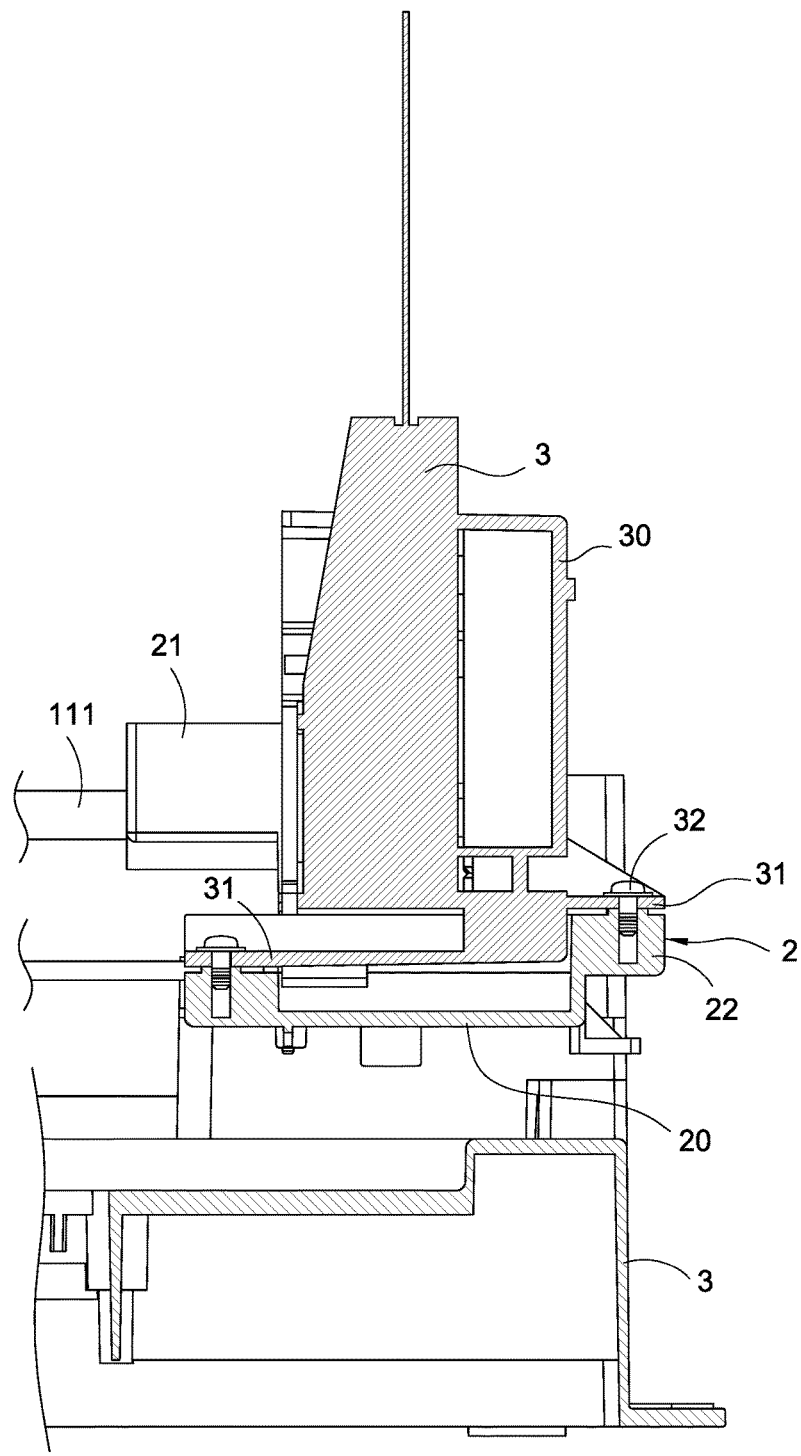
FIG. 5 is another partial cross sectional schematic view of another embodiment of the present invention.

Furthermore, as shown in FIG. 5, it depicts a partial cross sectional schematic view of another embodiment of the present invention. The laser module 3 can be integrally formed with the cover 30. Thus the laser module 3 can be directly assembled on the carrying seat 2 without transferring through the cover 30 as to combine with the carrying seat 2. However, the cover 30 is applicable to the produced laser module 3 and is directly applied to the present invention for considering a possible inventory issue of the production industry Therefore, the laser module with removable structures of three-dimensional printer of the present invention can be obtained by the above-mentioned configuration.

It is worth of notice that as the laser module 3 needs to be electrically connected with the control circuit board, a purpose of removing an electrical connection can be achieved through, for instance, a wire connecting with a plug or a socket; or a socket electrically connected with the control circuit board is disposed on the assembly portion 20 of the carrying seat 2, and a plug is disposed on the laser module 3 correspondingly as to achieve the purpose of electrical connection with the control circuit board through the plug and the socket when the laser module 3 is assembled on the assembly portion 20.

Hence, with the laser module with removable structures of three-dimensional printer, the movement mechanism 11 or the displacement rod 111 has no needs to be removed when the laser module 3 is disassembled through the carrying seat 2 which is provided for assembling the laser module 3. The disassembly and the assembly of the laser module 3 and the carrying seat 2 are performed in a detachable manner so that the purposes of fast and convenient disassembly can be achieved.

In summary, the present invention is a new creative product that can indeed achieve the intended use of purpose to solve the deficiency of prior art. Besides, the present invention has novelty and progress that meets the requirements of a new patent application in accordance with the patent law. Therefore, the present is filed in accordance with the patent law for protecting the rights of the inventor.

Although the present invention has been described with reference to the preferred embodiment thereof, it will be understood that the invention is not limited to the details thereof. Various substitutions and improvements have been suggested in the foregoing description, and others will occur to those of ordinary skill in the art. Therefore, all such substitutions and improvements are intended to be embraced within the scope of the invention as defined in the appended claims.

What is claimed is:

1. A laser module with detachable structures of three-dimensional printer, including:
 a platform having a working side; the platform being provided with a movement mechanism, and the movement mechanism at least having a displacement rod;
 a carrying seat disposed on the displacement rod; the movement mechanism driving the carrying seat to move on the working side along the displacement rod, and the carrying seat having an assembly portion; and
 a laser module disposed on the assembly portion of the carrying seat and detachably integrated with the assembly portion as a whole.

2. The laser module with detachable structures of three-dimensional printer according to claim 1, wherein the movement mechanism further includes a driver for driving the carrying seat moving on the working side along the displacement rod.

3. The laser module with detachable structures of three-dimensional printer according to claim 1, wherein the movement mechanism further includes a balance bar; the displacement rod is disposed on a side of the carrying seat, and the balance bar is disposed on another side of the carrying seat.

4. The laser module with detachable structures of three-dimensional printer according to claim 3, wherein the carrying seat further includes a sleeve portion disposed on a side of the assembly portion, and the sleeve portion is provided for the displacement rod slidably sleeved in.

5. The laser module with detachable structures of three-dimensional printer according to claim 1, wherein the assembly portion has a plurality of lower engaging portions extended at an outer edge thereof, and a bottom of the laser module has a plurality of upper engaging portions extended outwardly corresponding to the lower engaging portions; the upper engaging portions and the lower engaging portions are engaged with each other.

6. The laser module with detachable structures of three-dimensional printer according to claim 5, wherein the laser module further includes a cover; the cover has a chamber for accommodating the laser module, and the upper engaging portions are extended from a bottom of the cover separately.

7. The laser module with detachable structures of three-dimensional printer according to claim 6, wherein the laser module is integrally formed with the cover.

8. The laser module with detachable structures of three-dimensional printer according to claim 5, wherein the upper and lower engaging portions are combined with binding elements separately.

9. The laser module with detachable structures of three-dimensional printer according to claim 8, wherein the binding element is a screw.

10. The laser module with detachable structures of three-dimensional printer according to claim 9, wherein the lower engaging portion has a screw hole, and the upper engaging portion has a through hole.

* * * * *